US011964469B2

(12) United States Patent
Chino et al.

(10) Patent No.: US 11,964,469 B2
(45) Date of Patent: Apr. 23, 2024

(54) IMAGE FORMING APPARATUS

(71) Applicant: FUJIFILM Business Innovation Corp., Tokyo (JP)

(72) Inventors: Yuta Chino, Kanagawa (JP); Naohito Otsuki, Kanagawa (JP); Hiroyuki Suzuki, Kanagawa (JP); Takehiko Koizumi, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 38 days.

(21) Appl. No.: 17/580,041

(22) Filed: Jan. 20, 2022

(65) Prior Publication Data

US 2023/0062726 A1 Mar. 2, 2023

(30) Foreign Application Priority Data

Aug. 25, 2021 (JP) ................................ 2021-137622

(51) Int. Cl.
*B41J 11/00* (2006.01)
*B41J 13/08* (2006.01)
*B41J 13/22* (2006.01)

(52) U.S. Cl.
CPC ........... *B41J 11/0095* (2013.01); *B41J 13/08* (2013.01); *B41J 13/223* (2013.01); *B41J 2203/01* (2020.08)

(58) Field of Classification Search
CPC ........ B41J 11/007; B41J 29/38; B41J 29/393; B41J 13/223; B41J 2203/01; B41J 11/0095; B41J 13/08; B41J 11/42
See application file for complete search history.

(56) References Cited

U.S. PATENT DOCUMENTS 10,042,306 B2 8/2018 Izawa et al.

FOREIGN PATENT DOCUMENTS

JP 61-130147 A 6/1986
JP 2000-141857 A 5/2000
(Continued)

OTHER PUBLICATIONS

Extended European Search Report dated Sep. 20, 2022 in European Application No. 22166243.0.

*Primary Examiner* — Jannelle M Lebron
(74) *Attorney, Agent, or Firm* — Sughrue Mion, PLLC

(57) ABSTRACT

An image forming apparatus includes plural rotating members that are rotatable; an annular circulating member that is wound around the plural rotating members and circulates when the rotating members rotate; a retaining member attached to an attaching portion of the circulating member and that circulates together with the circulating member, the retaining member being configured to retain a recording medium in an area where the attaching portion comes into contact with one of the rotating members; an image forming section that forms an image on the recording medium at an image forming position defined on a circulation path along which the circulating member circulates; a delivering unit that delivers the recording medium to a retaining position where the recording medium is to be retained by the retaining member; a detector that detects rotation of the one rotating member; and a controller that controls delivery of the recording medium from the delivering unit to the retaining position, the delivery being controlled with reference to information detected by the detector.

20 Claims, 15 Drawing Sheets

(56) References Cited

FOREIGN PATENT DOCUMENTS

| | | | | | |
|---|---|---|---|---|---|
| JP | 2000141857 | A | * | 5/2000 | |
| JP | 2017-211614 | A | | 11/2017 | |
| JP | 2020-049830 | A1 | | 4/2020 | |
| WO | 2018/235437 | A1 | | 12/2018 | |
| WO | 2021/033392 | A1 | | 2/2021 | |
| WO | WO-2021033392 | A1 | * | 2/2021 | .......... B41J 11/0045 |
| WO | 2021/053890 | A1 | | 3/2021 | |

* cited by examiner

IMAGE FORMING APPARATUS

CROSS-REFERENCE TO RELATED APPLICATIONS

This application is based on and claims priority under 35 USC 119 from Japanese Patent Application No. 2021-137622 filed Aug. 25, 2021.

BACKGROUND

(i) Technical Field

The present disclosure relates to an image forming apparatus.

(ii) Related Art

An image forming apparatus disclosed by Japanese Unexamined Patent Application Publication No. 2020-49830 includes a rotating body provided on a surface thereof with a gripper for gripping a printing medium at a specific angular position defined on the surface, a transporting unit that transports the printing medium to the specific angular position, a printing unit that performs printing on the printing medium gripped by the gripper, a reading unit that reads an image of the printing medium having undergone printing by the printing unit, a calculating unit that calculates the amount of correction of the length of transport of the printing medium by the transporting unit from the relationship between the position of the leading end of the printing medium in the image read by the reading unit and the position of the gripper, a correcting unit that calculates from the calculated amount of correction a corrected speed at which the printing medium is to be transported by the transporting unit, and a changing unit that changes the speed of transport of the printing medium by the transporting unit to the corrected speed calculated by the correcting unit.

A possible image forming apparatus includes a plurality of rotating members such as rotatable sprocket wheels, a circulating member such as a chain that is wound around the plurality of rotating members and circulates when the rotating members rotate, a retaining member provided on the circulating member and that circulates together with the circulating member while retaining a recording medium such as a sheet, an image forming unit that forms an image on the recording medium at an image forming position defined on the path of circulation of the circulating member, a delivering unit that delivers the recording medium to a retaining position where the recording medium is to be retained by the retaining member, and a controller that controls the delivery of the recording medium to the retaining position by the delivering unit with reference to information on the position of the retaining member that is circulating.

In such a configuration, the expansion/contraction or vibration of the circulating member such as a chain may vary the timing of delivery of the recording medium. Consequently, the recording medium may be delivered to a position shifted from the retaining position where the recording medium is to be retained by the retaining member that is circulating.

SUMMARY

Aspects of non-limiting embodiments of the present disclosure relate to a configuration in which a recording medium is delivered to the position of retaining by a circulating retaining member with higher accuracy than in a configuration in which a recording medium is delivered to the position of retaining by a circulating retaining member with reference to information on the position of the circulating retaining member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a plurality of rotating members that are rotatable; an annular circulating member that is wound around the plurality of rotating members and circulates when the rotating members rotate; a retaining member attached to an attaching portion of the circulating member and that circulates together with the circulating member, the retaining member being configured to retain a recording medium in an area where the attaching portion comes into contact with one of the rotating members; an image forming section that forms an image on the recording medium at an image forming position defined on a circulation path along which the circulating member circulates; a delivering unit that delivers the recording medium to a retaining position where the recording medium is to be retained by the retaining member; a detector that detects rotation of the one rotating member; and a controller that controls delivery of the recording medium from the delivering unit to the retaining position, the delivery being controlled with reference to information detected by the detector.

BRIEF DESCRIPTION OF THE DRAWINGS

Exemplary embodiments of the present disclosure will be described in detail based on the following figures, wherein.

DETAILED DESCRIPTION

Figure 1:
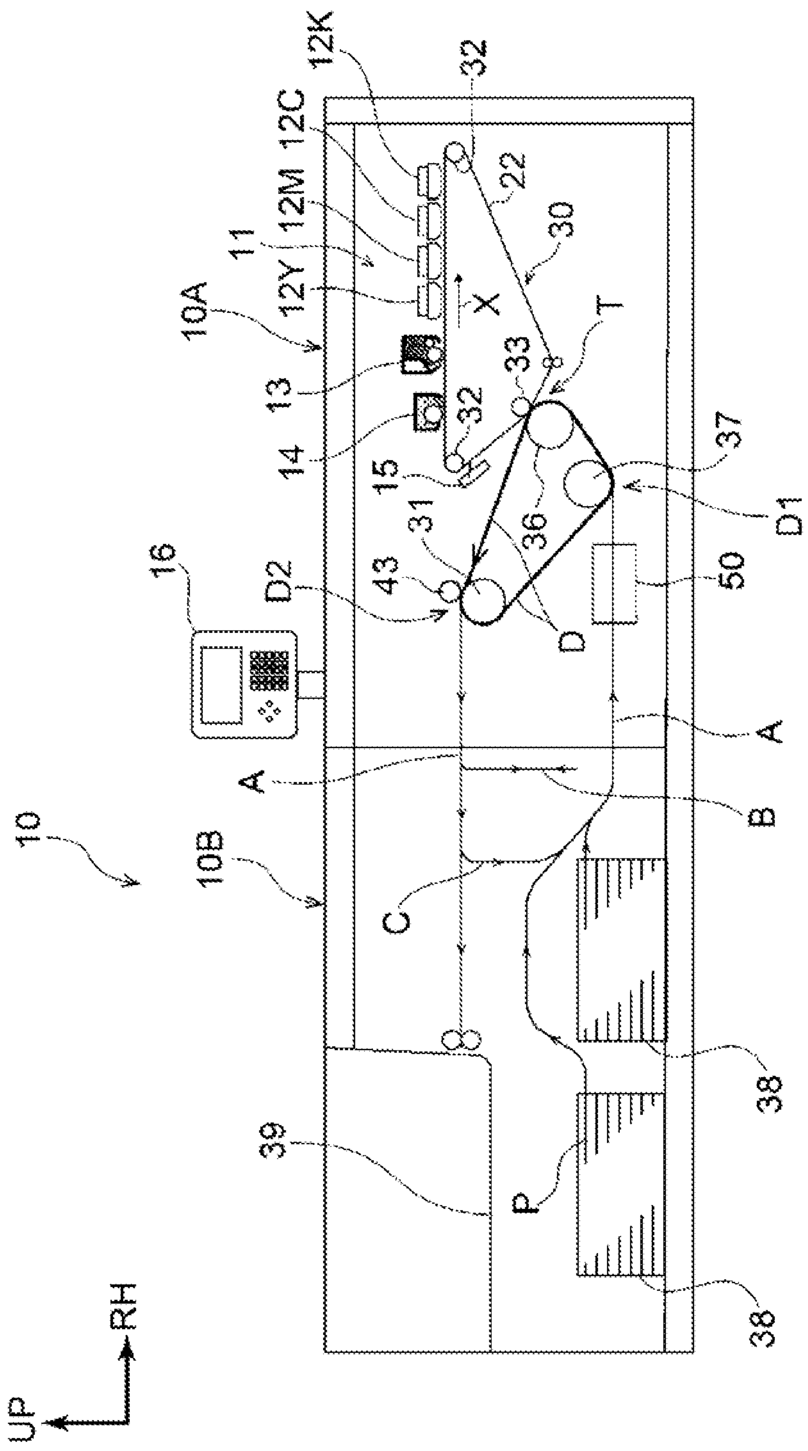
FIG. 1 is a front view of an image forming apparatus according to an exemplary embodiment of the present disclosure.

An image forming apparatus according to an exemplary embodiment of the present disclosure will now be described with reference to FIGS. 1 to 12. In the drawings, an arrow UP represents the upper side of the apparatus in the vertical direction; an arrow RH represents the right side of the apparatus, illustrated in front view in FIG. 1, in a horizontal direction; and an arrow FR represents the near side of the apparatus, illustrated in front view in FIG. 7, in another horizontal direction.

Hereinafter, the upper or lower side designated with no proposition refers to the upper or lower side of the apparatus illustrated in FIG. 1, the right or left side designated with no proposition refers to the right or left side of the apparatus illustrated in front view in FIG. 1, and the depth direction designated with no proposition refers to the depth direction of the apparatus illustrated in front view in FIG. 1 (herein after referred to as the apparatus-depth direction).

Outline of Image Forming Apparatus

A configuration of an image forming apparatus 10 according to the present exemplary embodiment will first be described. FIG. 1 illustrates an outline of the image forming apparatus 10 in front view.

Figure 2:
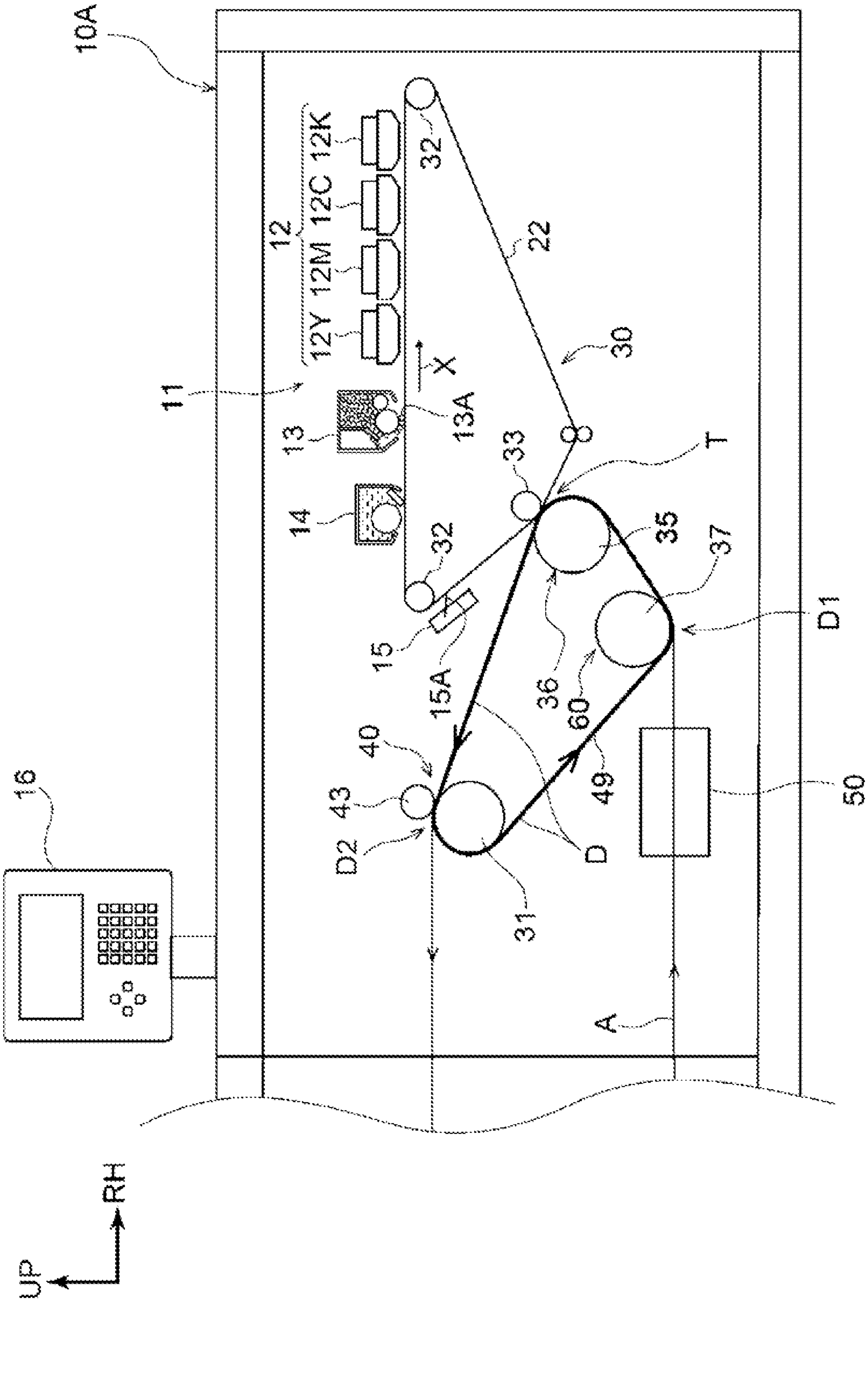
FIG. 2 is an enlargement of a part of the image forming apparatus illustrated in FIG. 1, around an image forming position.

As illustrated in FIG. 1, the image forming apparatus 10 includes a unit 10A, provided on the right side; and a unit 10B, provided on the left side. Referring to FIG. 2, the unit 10A of the image forming apparatus 10 includes the following: a transporting body 31 and a pair of sprocket wheels (not illustrated) included therein, a transferring body 36 and a pair of sprocket wheels 35 included therein, a relaying body 60 and a pair of sprocket wheels 37 included therein, a pair of chains 49 (exemplary circulating members), a plurality of grippers 42 (exemplary retaining members, see FIG. 3), an image forming section 11, a position adjusting unit 50 (an exemplary delivering unit), a first detecting device 80 (an exemplary first detector, see FIG. 5), a second detecting device 90 (an exemplary second detector, see FIG. 10), and a controller 16. Referring to FIG. 1, the unit 10B of the image forming apparatus 10 includes sheet feeding trays 38 (exemplary storage units) and a sheet output tray 39 (an exemplary output portion).

The pair of sprocket wheels (not illustrated) included in the transporting body 31, the pair of sprocket wheels 35 included in the transferring body 36, and the pair of sprocket wheels 37 included in the relaying body 60 according to the present exemplary embodiment are exemplary rotating members.

Image Forming Section

The image forming section 11 has a function of forming an image on a sheet P (an exemplary recording medium) at an image forming position defined on a circulation path D, along which the pair of chains 49 to be described below circulates. Specifically, the image forming section 11 forms an image on a sheet P as follows: an image is first formed on a surface (outer circumferential surface) of a transfer belt 22, to be described below, and the image thus formed is transferred to a sheet P at a transfer position T, which is regarded as the image forming position. Referring to FIG. 2, the image forming section 11 includes a plurality of printheads 12 and a transfer unit 30. More specifically, the image forming section 11 according to the present exemplary embodiment includes four printheads 12, which are provided for respectively different colors: yellow (Y), magenta (M), cyan (C), and black (K).

The printheads 12 have a function of forming an ink image on the surface (outer circumferential surface) of the transfer belt 22 by an inkjet method. Specifically, the plurality of printheads 12 form an ink image composed of the four respective colors on the surface of the transfer belt 22.

The colors of yellow (Y), magenta (M), cyan (C), and black (K) are basic colors for outputting a color image. Hereinafter, if there is no need to distinguish the printheads 12 from one another by the colors, the printheads are each be simply denoted as "printhead 12", omitting a corresponding one of the reference characters Y, M, C, and K representing the respective colors.

The printheads 12Y, 12M, 12C, and 12K basically have the same configuration but are different in inks to be used. As illustrated in FIG. 2, the printheads 12Y, 12M, 12C, and 12K are arranged side by side along a horizontal portion of the transfer belt 22 and on the downstream side with respect to a particle supplying device 13, to be described below, in a direction in which the transfer belt 22 circulates (a direction X illustrated in FIG. 2).

The particle supplying device 13 supplies ink absorbing particles 13A to the outer circumferential surface of the transfer belt 22, thereby forming a layer of ink absorbing particles 13A (not illustrated). With reference to image information inputted to the image forming apparatus 10, the printheads 12Y, 12M, 12C, and 12K eject droplets of the inks having the respective colors Y, M, C, and K to the layer of ink absorbing particles 13A on the transfer belt 22 such that the droplets of the respective inks are superposed one on top of another. The droplets of the inks ejected from the printheads 12Y, 12M, 12C, and 12K are absorbed by the layer of ink absorbing particles 13A, whereby an ink image is formed on the outer circumferential surface of the transfer belt 22. Thus, the image forming section 11 forms an image on the surface (outer circumferential surface) of the transfer belt 22.

The transfer unit 30 has a function of transferring the image (the ink image) formed on the surface of the transfer belt 22 to a sheet P. As illustrated in FIG. 2, the transfer unit 30 includes the transfer belt 22 (an exemplary transferring member), a plurality of rollers 32, a transfer roller 33, and the transferring body 36 (an exemplary body). The transfer unit 30 further includes an adhesive-layer-forming device 14, the particle supplying device 13, and a cleaner 15.

As illustrated in FIG. 2, the transfer belt 22 is endless and is stretched around the plurality of rollers 32 and the transfer roller 33 in such a manner as to form an inverted triangular shape in front view (in a view from the near side in the apparatus-depth direction). The transfer belt 22 circulates in the direction X when at least one of the plurality of rollers 32 is driven to rotate. The printheads 12 for the respective colors, the particle supplying device 13, the adhesive-layer-forming device 14, and the cleaner 15 are provided on the outer side of the transfer belt 22.

The transfer roller 33 is provided on the inner side of the transfer belt 22.

Figure 7:
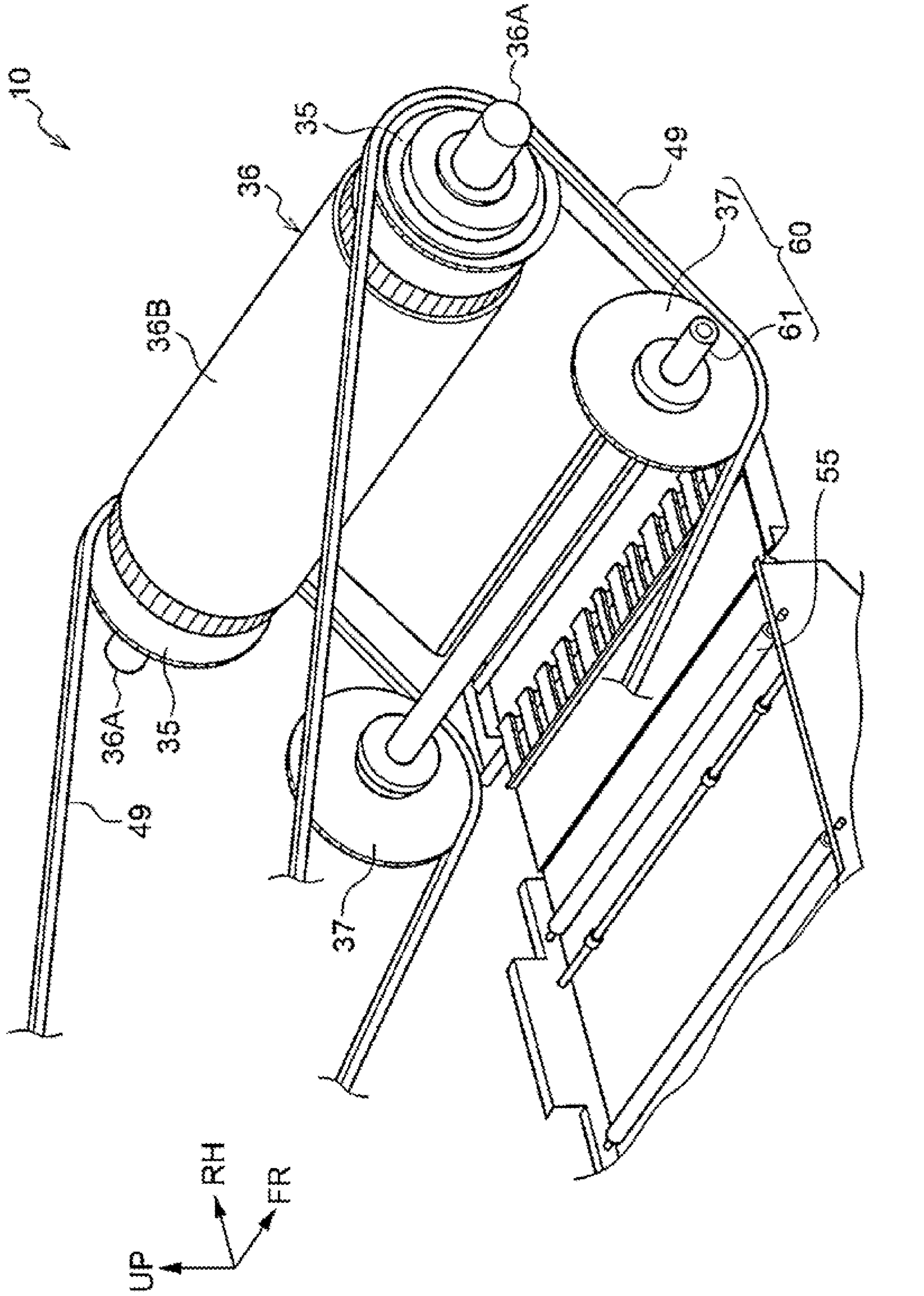
FIG. 7 is a perspective view of a relevant part of the image forming apparatus illustrated in FIG. 1.
Figure 8A:
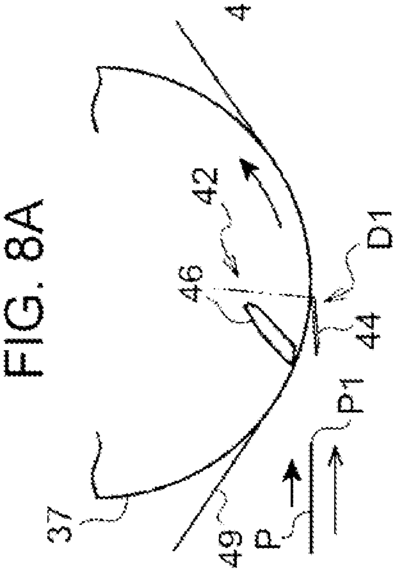
FIGS. 8A to 8F are front views of a part of the image forming apparatus illustrated in FIG. 1 and illustrate how the gripper operates while a sheet is transported.
Figure 8B:
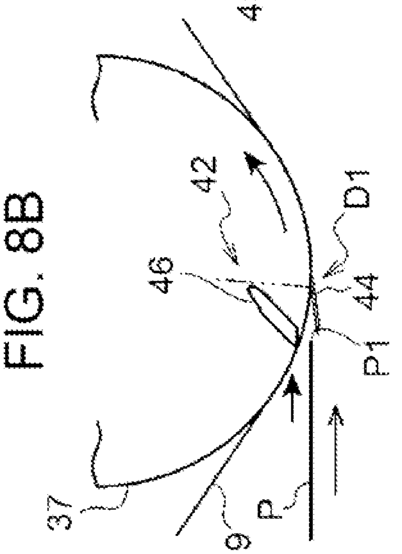
Figure 8C:
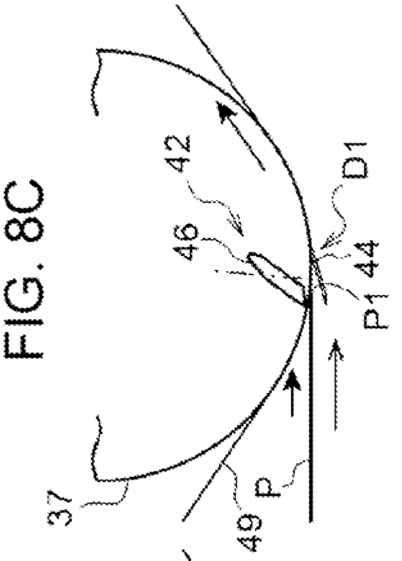
Figure 8D:
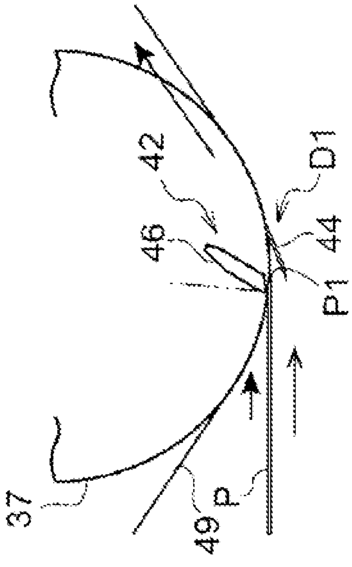
Figure 8E:
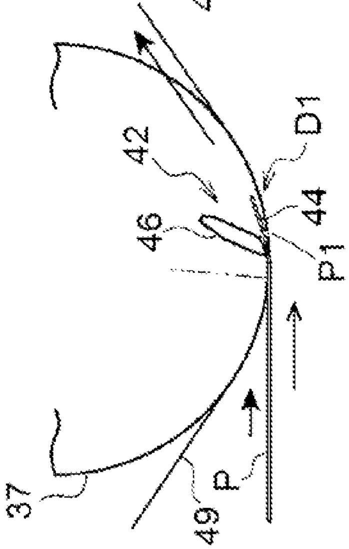
Figure 8F:
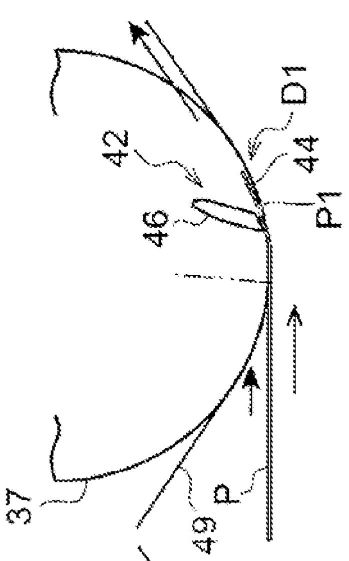
Figure 9:
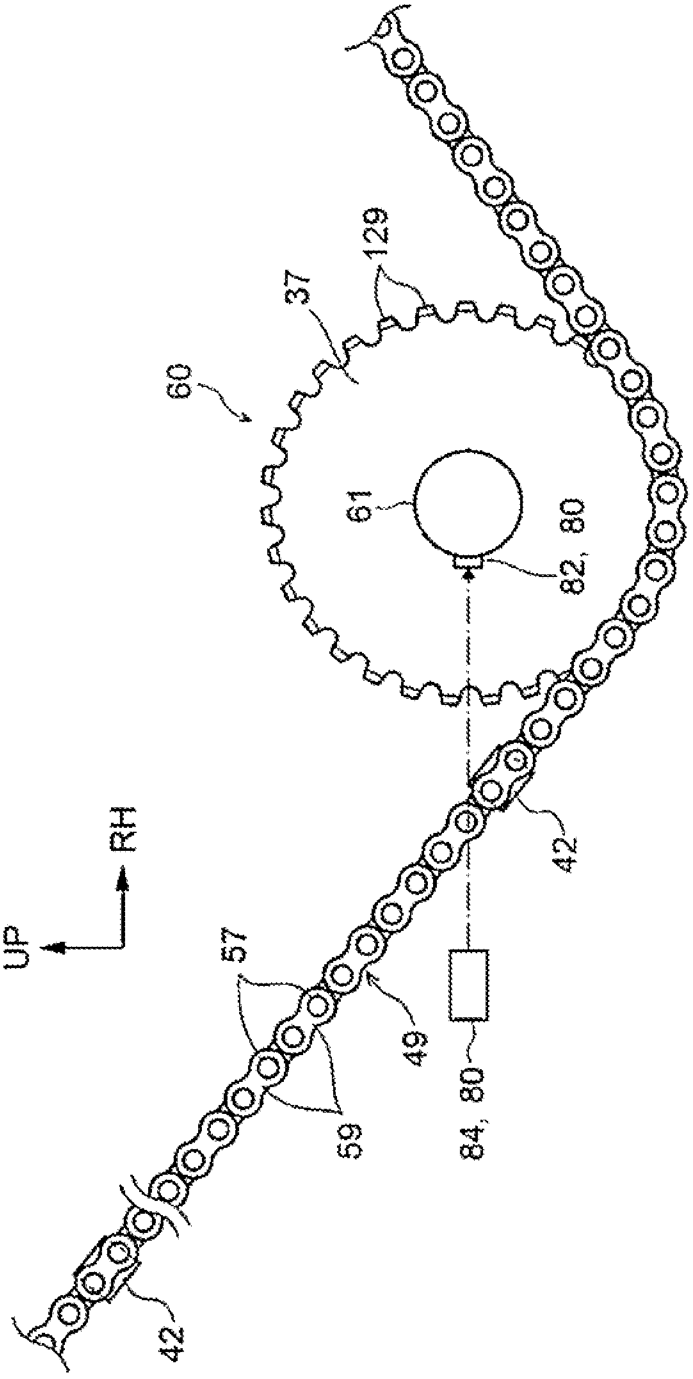
FIG. 9 is a front view of a relevant part of the image forming apparatus illustrated in FIG. 1.

The transferring body 36 is provided across the transfer belt 22 from the transfer roller 33. Referring to FIG. 7, the transferring body 36 extends in the apparatus-depth direction.

As illustrated in FIG. 7, the transferring body 36 includes a shaft 36A and a roller member 36B. The shaft 36A extends in the apparatus-depth direction. The roller member 36B is a cylindrical member provided on an axially central portion of the shaft 36A. The shaft 36A is provided at the two axial ends thereof with the above-mentioned pair of sprocket wheels 35, respectively. In other words, the roller member 36B of the transferring body 36 is positioned between the pair of sprocket wheels 35.

As illustrated in FIG. 7, the pair of chains 49 are wound around the respective sprocket wheels 35 of the transferring body 36. The transferring body 36 rotates by following the chains 49 that circulates.

The roller member 36B of the transferring body 36 has a recess (not illustrated), in which a relevant one of the grippers 42 is allowed to be positioned. The recess is regarded as a groove extending from one end to the other end of the roller member 36B in the axial direction (the apparatus-depth direction).

The transferring body 36 is provided thereinside with a heat source (not illustrated), which is capable of heating an outer circumferential portion of the transferring body 36.

The transferring body 36 defines a nip area in combination with the transfer roller 33, which presses the transfer belt 22 outward against the transferring body 36. In other words, the nip area is defined between the transferring body 36 and the transfer belt 22. The transferring body 36, which rotates by following the chains 49 that circulate, drags the transfer belt 22 at the nip area. In the nip area, a sheet P that is transported by a combination of the chains 49 and a relevant one of the grippers 42 is nipped between the transferring body 36 whose outer circumferential portion is heated and the transfer belt 22 having an ink image formed thereon. In such a state, the transferring body 36 transfers the ink image from the transfer belt 22 to the sheet P while dragging the transfer belt 22. The nip area defined between the transferring body 36 and the transfer belt 22 is regarded as the transfer position T (an exemplary image forming position). That is, in the image forming apparatus 10 according to the present exemplary embodiment, an ink image formed on the surface of the transfer belt 22 by the image forming section 11 is transferred at the transfer position T to the surface of a sheet P that is wound around the transferring body 36.

Referring to FIG. 2, the adhesive-layer-forming device 14, facing the horizontal portion of the transfer belt 22 stretched into an inverted triangular shape, is provided on the upstream side with respect to the particle supplying device 13 in the direction of circulation of the transfer belt 22. In other words, the adhesive-layer-forming device 14 is provided on the left side with respect to the particle supplying device 13. The adhesive-layer-forming device 14 contains adhesive thereinside and forms an adhesive layer (not illustrated) by applying the adhesive to the outer circumferential surface of the circulating transfer belt 22. The adhesive may be, for example, glue or an organic solvent.

The particle supplying device 13, facing the horizontal portion of the transfer belt 22, is provided on the downstream side with respect to the adhesive-layer-forming device 14 in the direction of circulation of the transfer belt 22. In other words, the particle supplying device 13 is provided on the right side with respect to the adhesive-layer-forming device 14. The particle supplying device 13 contains thereinside the ink absorbing particles 13A, which are capable of absorbing ink droplets. The particle supplying device 13 supplies the ink absorbing particles 13A to the transfer belt 22 having the adhesive layer formed thereon. Consequently, the ink absorbing particles 13A supplied from the particle supplying device 13 to the transfer belt 22 are made to adhere to the adhesive layer with the adhesive force of the adhesive layer, whereby a layer of ink absorbing particles 13A is formed on the transfer belt 22.

The layer of ink absorbing particles 13A thus formed on the transfer belt 22 comes into contact with the sheet P nipped at the transfer position T between the transfer belt 22 and the transferring body 36 and is heated by the transferring body 36, whereby the layer of ink absorbing particles 13A is transferred to the sheet P. In this process, since the layer of ink absorbing particles 13A bears the ink droplets absorbed therein and forming an ink image, the ink image is transferred to the sheet P together with the layer of ink absorbing particles 13A.

The cleaner 15 is provided on the downstream side with respect to the transfer position T and on the upstream side with respect to the adhesive-layer-forming device 14 in the direction of circulation of the transfer belt 22. The cleaner 15 includes a blade 15A, which is provided in contact with the outer circumferential surface of the transfer belt 22. With the circulation of the transfer belt 22, the cleaner 15 functions in such a manner as to remove with the blade 15A thereof residual adhesive, residual ink absorbing particles 13A, and any other foreign matter (such as paper lint if the sheet P is a piece of paper) from a portion of the transfer belt 22 that has passed through the transfer position T (the nip area).

Referring to FIG. 1, the image forming apparatus 10 according to the present exemplary embodiment includes a plurality of sheet feeding trays 38. A sheet P fed from one of the plurality of sheet feeding trays 38 is transported along a sheet transport path A, passes through the transfer position T, and is outputted to the sheet output tray 39. Specifically, the sheet transport path A starts from the unit 10B, runs through the unit 10A, and returns into the unit 10B. Accordingly, the sheet P fed from the sheet feeding tray 38 in the unit 10B is transported along the sheet transport path A through the unit 10A and returns into the unit 10B.

The sheet transport path A has a branch provided on the downstream side with respect to a receiving position D2, which will be described below. The branch serves as a turn-over path B, in which the sheet P is turned over. The turn-over path B merges with a further downstream portion of the sheet transport path A in the direction of sheet transport (hereinafter referred to as "sheet transporting direction"). A portion of the sheet transport path A that extends between the turn-over path B and the circulation path D forms a duplex path that serves as both a transport path for image formation on the front side of the sheet P and a transport path for image formation on the back side of the sheet P. The circulation path D will be described separately below. The transport paths described above are provided with a plurality of sheet transporting rollers (not illustrated). The sheet P is transported by those rollers along the transport paths.

Referring to FIG. 2, the image forming apparatus 10 includes a fixing unit 40, which is provided on the downstream side with respect to the transfer position T in the sheet transporting direction. The fixing unit 40 has a function of fixing the ink image transferred to the sheet P by the transfer unit 30. Specifically, as illustrated in FIG. 2, the fixing unit 40 includes a heating roller 43 and the transporting body 31. The heating roller 43 serves as a heating unit that heats the sheet P by coming into contact with the sheet P that is being transported. The transporting body 31 serves as a pressing unit that nips the sheet P in combination with the heating roller 43 and presses the sheet P against the heating roller 43. The transporting body 31 and the heating roller 43 are provided across the sheet transport path A from each other. That is, the sheet P to be subjected to fixing is transported through the nip between the transporting body 31 and the heating roller 43.

The transporting body 31 has a function of pressing the sheet P by nipping the sheet P in combination with the heating roller 43. Specifically, the transporting body 31 includes a shaft (not illustrated) extending in the apparatus-depth direction, a roller member (not illustrated) in the form of a cylindrical member provided on an axially central portion of the shaft, and a recess (not illustrated) provided in the outer circumferential surface of the roller member. The shaft of the transporting body 31 is provided at the two axial ends thereof with the pair of sprocket wheels (not illustrated), respectively. The pair of chains 49 are wound around the respective sprocket wheels. In other words, the roller member of the transporting body 31 is provided between the pair of sprocket wheels.

Referring to FIG. 2, the chains 49 are wound around the respective sprocket wheels of the transporting body 31. Therefore, the transporting body 31 rotates by following the chains 49 that circulate.

The roller member of the transporting body 31 has a recess (not illustrated), in which a relevant one of the grippers 42 is allowed to be positioned. The recess is regarded as a groove extending from one end to the other end of the roller member of the transporting body 31 in the axial direction (the apparatus-depth direction).

The heating roller 43 has a function of heating the sheet P. Specifically, the heating roller 43 includes a shaft (not illustrated) extending in the apparatus-depth direction, and a roller member (not illustrated) in the form of a cylindrical member provided on an axially central portion of the shaft.

The outer circumferential surface of the roller member of the heating roller 43 is in contact with the outer circumferential surface of the roller member of the transporting body 31, whereby a nip area where the sheet P is to be nipped between the transporting body 31 and the heating roller 43 is defined. The nip area defined between the transporting body 31 and the heating roller 43 is regarded as the receiving position D2 (an exemplary image receiving position).

Basic Image Forming Operation

An outline of a basic image forming operation to be performed on a sheet P by the image forming apparatus 10 will now be described.

Operations to be performed in the image forming apparatus 10 are initiated by the controller 16 included in the apparatus 10. When the controller 16 receives an image formation command from an external device, the controller 16 activates the printheads 12 of the image forming section 11. Furthermore, the controller 16 transmits image data processed by an image-signal-processing unit (not illustrated) to the image forming section 11. Then, the image forming section 11 forms an ink image on the surface of the transfer belt 22. The ink image on the transfer belt 22 is transferred to a sheet P at the transfer position T. Thus, a sheet P having an image formed thereon is obtained.

In duplex printing, the sheet P having passed through the receiving position D2 advances into the turn-over path B branching off from the sheet transport path A, whereby the sheet P is turned over. Then, the sheet P is transported along a transport path C, which is provided with a plurality of rollers (not illustrated), into the sheet transport path A again.

Sprocket Wheels

Referring to FIG. 2, the pair of sprocket wheels of the transporting body 31, the pair of sprocket wheels 35 of the transferring body 36, and the pair of sprocket wheels 37 of the relaying body 60 are provided therearound with the pair of chains 49. The chains 49 are under a predetermined tension by being wound around the forgoing sprocket wheels. Referring to FIG. 7, the sprocket wheels 37 are provided at the two respective axial ends of a connecting shaft 61, which extends in the apparatus-depth direction. That is, the relaying body 60 includes the connecting shaft 61 and the pair of sprocket wheels 37. The sprocket wheels 37, the sprocket wheels 35, and the sprocket wheels of the transporting body 31 are positioned in that order from the upstream side in the sheet transporting direction. The sprocket wheels 37 according to the present exemplary embodiment are exemplary first rotating members. The sprocket wheels 35 according to the present exemplary embodiment are exemplary second rotating members.

Chains

The chains 49 are provided with the plurality of grippers 42 and have a function of transporting in the direction of circulation thereof (along the circulation path D illustrated in FIG. 3) a sheet P that is retained by a relevant one of the grippers 42. Specifically, the chains 49 each have an annular shape and are wound around the sprocket wheels of the transporting body 31, the sprocket wheels 35, and the sprocket wheels 37. More specifically, one of the pair of chains 49 is wound around one of the pair of sprocket wheels of the transporting body 31, one of the pair of sprocket wheels 35, and one of the pair of sprocket wheels 37 on the near side in the apparatus-depth direction; and the other chain 49 is wound around the other sprocket wheel of the transporting body 31, the other sprocket wheel 35, and the other sprocket wheel 37 on the far side in the apparatus-depth direction.

For simplicity, each pair of sprocket wheels and the pair of chains 49 are hereinafter collectively referred to as the sprocket wheel and the chain 49, unless stated otherwise. The chain 49 circulates with the rotation of any one of the three sprocket wheels that serves as a driver: the sprocket wheel of the transporting body 31, the sprocket wheel 35, or the sprocket wheel 37. The sprocket wheels other than the one serving as the driver rotate by following the chain 49 that circulates.

Figure 3:
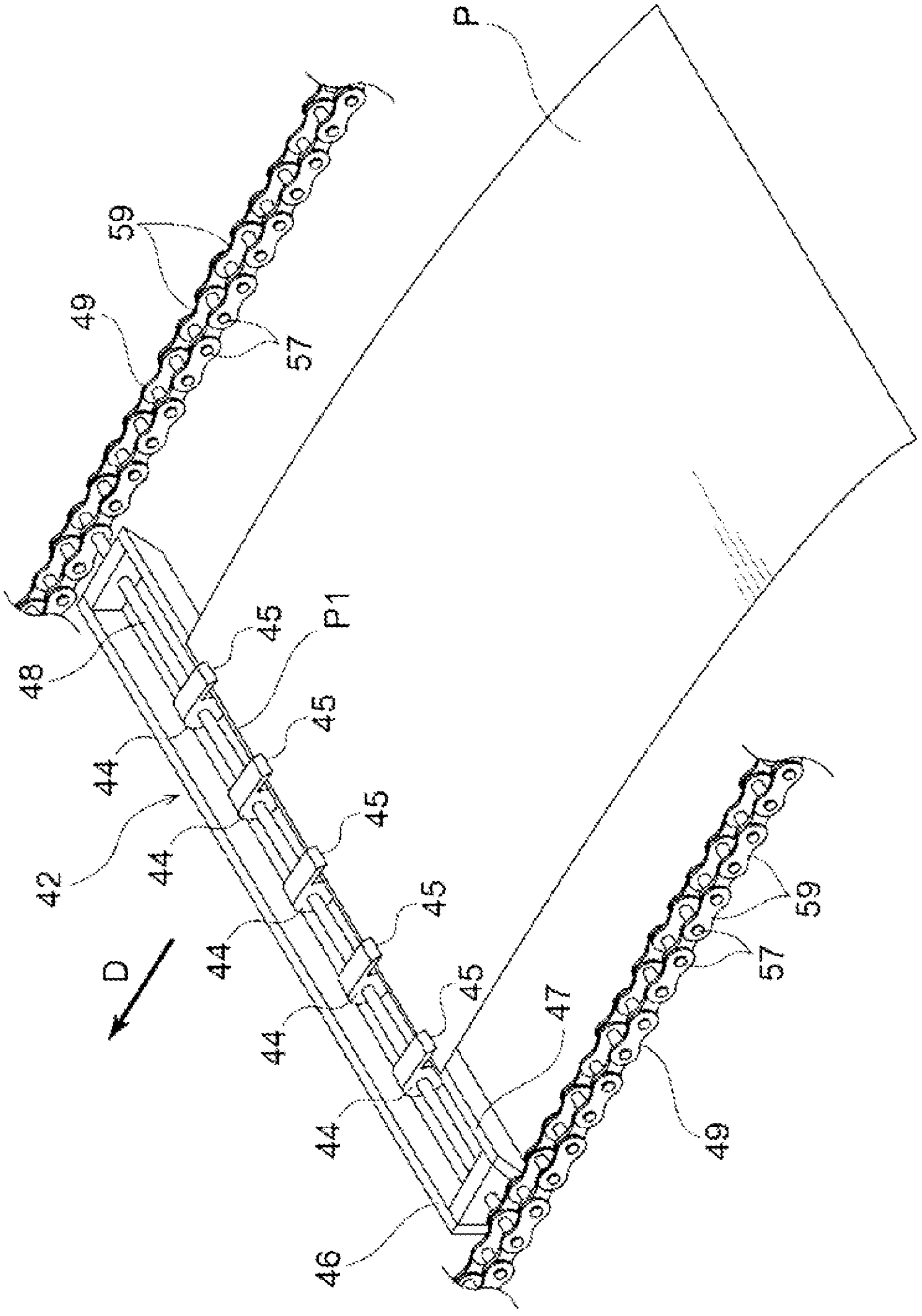
FIG. 3 is an enlargement of a part of the image forming apparatus illustrated in FIG. 1, where a gripper retains a sheet.

Referring to FIG. 3, the chain 49 is formed of roller links 59 and pin links 57. The roller links 59 are each an assembly of a bush, a freely rotatable roller fitted in the bush, and a link plate. The roller links 59 are connected to one another with the pin links 57. The plurality of grippers 42 attached to the chain 49 are positioned thereon at predetermined intervals from one another.

Grippers

Figure 4A:
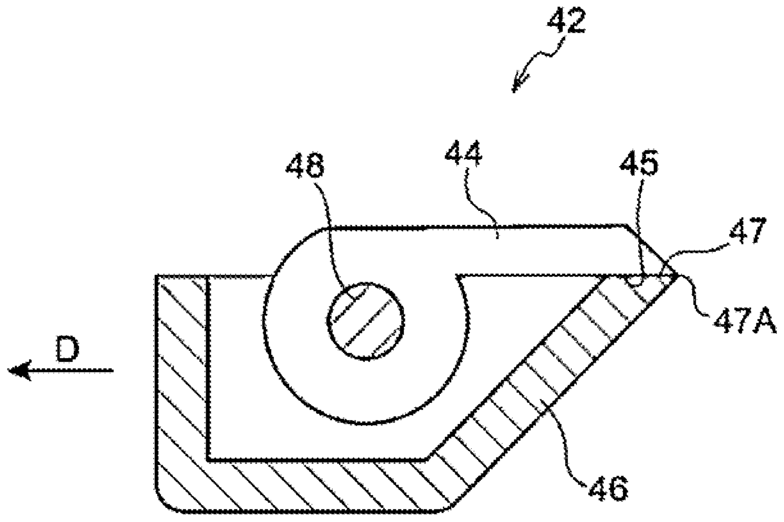
FIGS. 4A and 4B are sectional views of the gripper of the image forming apparatus illustrated in FIG. 1 and illustrate how the gripper operates.
Figure 4B:
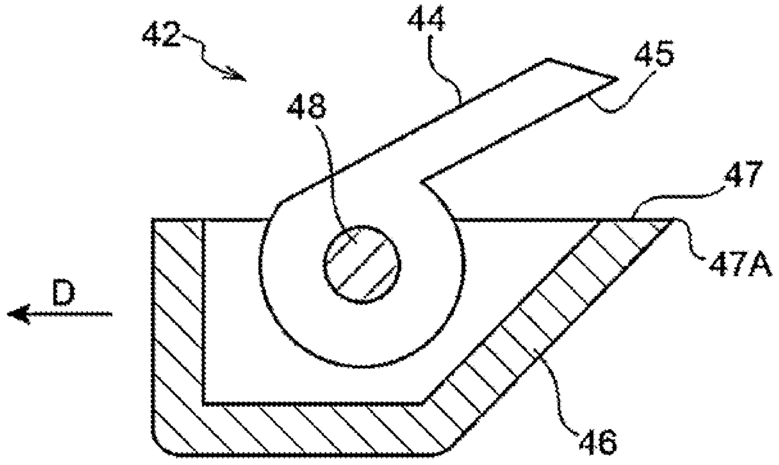

Referring to FIG. 3 and FIGS. 4A and 4B, the grippers 42 attached to respective portions (hereinafter referred to as "attaching portions") of the chain 49 circulate together with the chain 49 and have a function of retaining the sheet P. Specifically, referring to FIGS. 8A to 8F, one of the grippers 42 retains a leading end P1 (see FIG. 3) of the sheet P to be transported through an area where the corresponding attaching portion of the chain 49 comes into contact with the sprocket wheel 37. The gripper 42 in such a state circulates together with the chain 49, thereby assisting the transport of the sheet P. The plurality of grippers 42 attached to the chain 49 are positioned thereon at predetermined intervals from one another. The chain 49 is in contact with the sprocket wheel 37 in such a manner as to be in mesh therewith. That is, the attaching portion of the chain 49 comes into contact with the sprocket wheel 37 in such a manner as to come into mesh therewith. The meshing of the attaching portion of the chain 49 with the sprocket wheel 37 is also regarded as the contact between the attaching portion and the sprocket wheel 37. Therefore, the area where the two mesh with each other is also regarded as a contact area.

The grippers 42 each include a plurality of clips 44, a case 46, and a shaft 48. The case 46 has a rectangular shape and covers the clips 44. The shaft 48 extends in the apparatus-depth direction.

The clips 44 are fixed to the shaft 48 and rotate together with the shaft 48. The clips 44 are arranged on the shaft 48 at intervals from one another in the axial direction of the shaft 48 (the apparatus-depth direction) (see FIG. 3).

The case 46 is elongated in the apparatus-depth direction and is held by the shaft 48. The case 46 is rotatable independently of the clips 44. The case 46 covers the upstream and downstream sides of the clips 44 in the sheet transporting direction and the back side of the sheet P transported thereto. Herein, the term "back side" refers to the side of the sheet P on which no image is to be formed. The clips 44, which have respective tips 45, and the case 46, which has a catch 47 at the upstream end thereof in the sheet transporting direction, are capable of holding the leading end P1 of the sheet P between the tips 45 and the catch 47 thereof. The catch 47 has a tip 47A as illustrated in FIGS. 4A and 4B.

The shaft 48 is held at the two ends thereof in the apparatus-depth direction by the pair of chains 49. When the pair of chains 49 circulate, the shaft 48 that is fixed to the pair of chains 49 also circulates. Accordingly, the grippers 42 each held by the pair of chains 49 circulate along the predetermined circulation path D (see FIG. 2).

Referring to FIG. 1, a portion of the circulation path D of the chains 49 overlaps the sheet transport path A in the front view of the image forming apparatus 10. Specifically, the overlap between the circulation path D and the sheet transport path A starts from a contact point between the sheet transport path A and the outer circumference of the sprocket wheel 37 and ends at a point past the receiving position D2.

When one of the grippers 42 reaches the start point of the overlap between the sheet transport path A and the circulation path D, the tips 45 of the clips 44 of that gripper 42 move closer to the catch 47 of the case 46 and retain the leading end P1 of the sheet P in combination with the catch 47. The position in the circulation path D where the gripper 42 retains the sheet P is defined as a relay position D1, where the sheet P is relayed from the sheet transport path A to the gripper 42.

When the gripper 42 reaches the end point of the overlap between the sheet transport path A and the circulation path D, the tips 45 of the clips 44 of the gripper 42 move away from the catch 47 of the case 46 and release the leading end P1 of the sheet P. The position in the circulation path D where the gripper 42 releases the sheet P is defined as the receiving position D2, where the sheet P released from the gripper 42 is received by the sheet transport path A.

In the present exemplary embodiment, the speed of circulation of the grippers 42 is equal to the speed of rotation of each of the plurality of pairs of sprocket wheels.

Position Adjusting Unit

Figure 5:
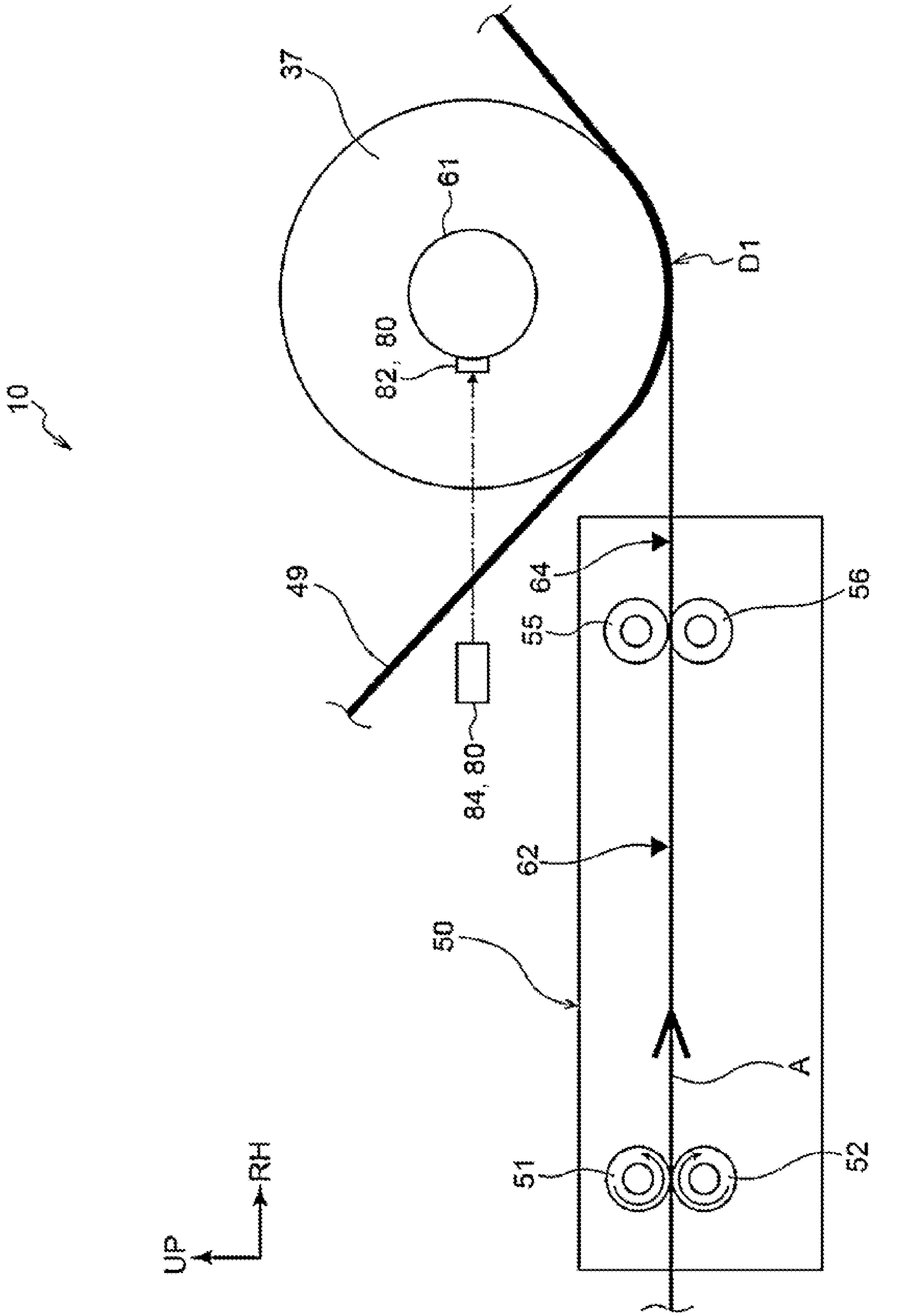
FIG. 5 is an enlargement of a position adjusting unit included in the image forming apparatus illustrated in FIG. 1.

The position adjusting unit 50 has a function of delivering the sheet P to the relay position D1, which is also regarded as a retaining position where the gripper 42 retains the sheet P. Specifically, referring to FIG. 1, the position adjusting unit 50 is provided on the duplex path included in the sheet transport path A and extending between the turn-over path B and the relay position D1. Referring to FIG. 5, the position adjusting unit 50 includes transporting rollers 51 and 52, registration rollers 55 and 56, and passage sensors 62 and 64. The rollers of the same kind are positioned on the upper side and the lower side, respectively, of the sheet transport path A. The upper transporting roller 51 and the lower transporting roller 52 are paired to rotate, and the upper registration roller 55 and the lower registration roller 56 are paired to rotate, whereby the sheet P is transported.

The passage sensors 62 and 64 each detect the passage and absence of the sheet P that is transported along the sheet transport path A. The passage sensors 62 and 64 transmit respective signals to the controller 16. With reference to the signals, the operations of the transporting rollers 51 and 52 and the registration rollers 55 and 56 are controlled. Referring to FIG. 5, when the leading end P1 (see FIG. 3) of the sheet P reaches the pair of registration rollers 55 and 56, the transport of the sheet P is stopped temporarily. The registration rollers 55 and 56 are driven to rotate with a preset timing so as to deliver the sheet P to the relay position D1.

Figure 6A:
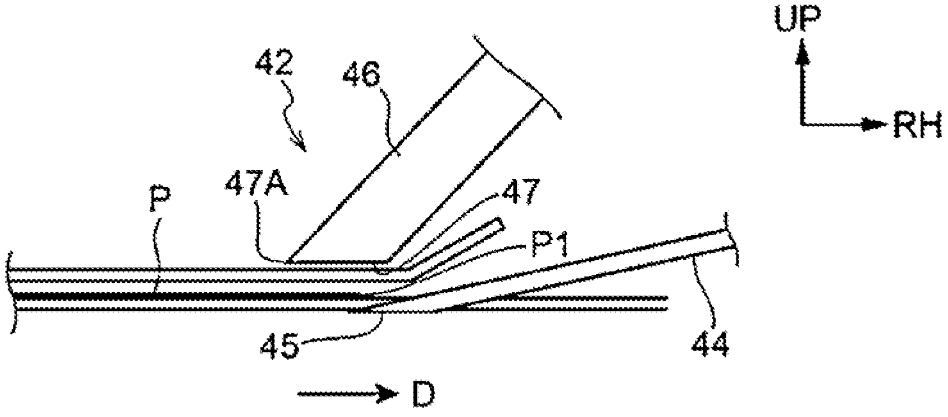
FIGS. 6A to 6C are enlargements of the gripper of the image forming apparatus illustrated in FIG. 1 and illustrate how the gripper retains the leading end of a sheet.
Figure 6B:
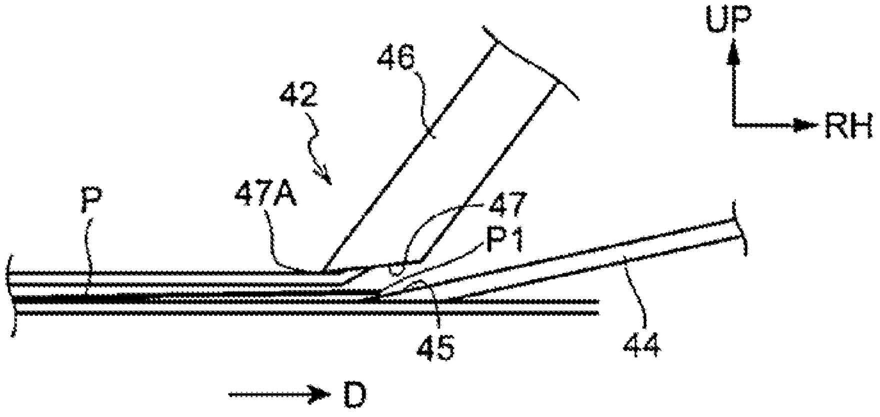
Figure 6C:
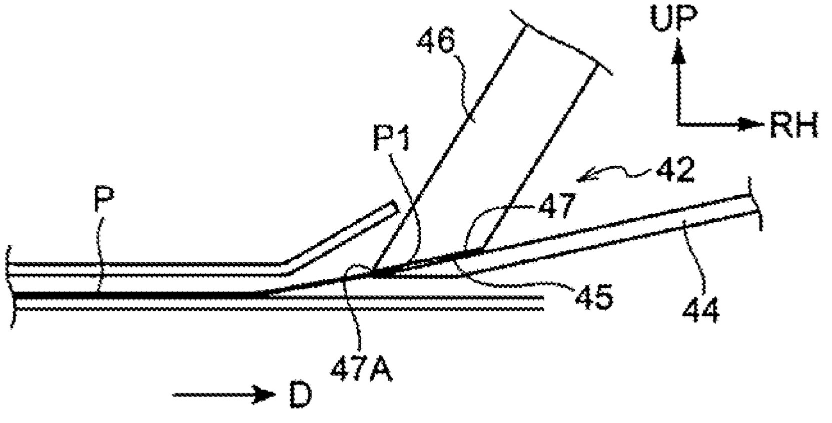

The sheet P thus delivered from the position adjusting unit 50 is held between the catch 47 of the case 46 of the gripper 42 and the tips 45 of the clips 44, as illustrated in FIG. 6A to 6C, on a virtual circumference coinciding with the circumference of the sprocket wheel 37 illustrated in FIG. 5. The gripper 42 is supplied along the circulation path D synchronously with the transport of the sheet P that is timed with reference to the leading end P1. At the beginning of this process, as illustrated in FIG. 6A, there are gaps between the case 46 and the clips 44. As the gripper 42 advances along the circulation path D synchronously with the delivery of the sheet P from the position adjusting unit 50 to the relay position D1, as illustrated in FIG. 6B, the gaps between the case 46 and the clips 44 are gradually reduced and the tips 45 of the clips 44 lift the leading end P1 of the sheet P from the sheet transport path A. Then, as illustrated in FIG. 6C, the leading end P1 of the sheet P is further lifted by the clips 44 and is held between the catch 47 of the case 46 and the tips 45 of the clips 44. Thus, the sheet P is relayed from the sheet transport path A to the circulation path D. From then on, the sheet P is transported by the gripper 42 along the circulation path D. The position where the sheet P is relayed from the sheet transport path A to the circulation path D is defined as the relay position D1.

Referring to FIG. 1, the sheet P relayed to the circulation path D is turned over by being transported along the outer circumference of the transferring body 36 and reaches the transfer position T defined on the outer circumference of the transferring body 36. That is, while the sheet P is turned over by being transported along the circulation path D around the outer circumference of the transferring body 36, the sheet P passes through the transfer position T.

The side of the sheet P that faces the transfer roller 33 at the transfer position T is an image forming surface, i.e., the front side. That is, in the position adjusting unit 50 and at the relay position D1, the sheet P is transported with an image non-forming surface, i.e., the back side, thereof facing upward.

The sheet P having passed through the transfer position T and leaving the circulation path D is received by the sheet transport path A. The point between the circulation path D and the sheet transport path A is defined as the receiving position D2. At the receiving position D2, the leading end P1 of the sheet P that has been retained by the gripper 42 is released, whereby the sheet P leaves the circulation path D and is received by the sheet transport path A.

Feature Configuration

A configuration featured in the present exemplary embodiment will now be described.

First Detecting Device

The first detecting device 80 has a function of detecting the rotation of the sprocket wheel 37. Specifically, the first detecting device 80 detects the period of rotation of the connecting shaft 61 to which the sprocket wheel 37 is attached. Referring to FIG. 5, the first detecting device 80 includes a first light shield 82 and a first photodetector 84. The first light shield 82 rotates together with the sprocket wheel 37. The first photodetector 84 is fixed to an apparatus body (in the present exemplary embodiment, the housing of the unit 10A) that supports the sprocket wheel 37, and detects the passage (i.e., shielding) of the first light shield 82 across an optical path. More specifically, the first light shield 82 is a plate attached to the outer circumference of the connecting shaft 61 that rotates together with the sprocket wheel 37. While the first light shield 82 according to the present exemplary embodiment is attached to a position of the connecting shaft 61 that is on the outer side with respect to the sprocket wheel 37 in the axial direction, the position of the first light shield 82 is not limited thereto. The first photodetector 84 is an optical sensor. When the first light shield 82 passes across the optical path, the first photodetector 84, which is positioned on the radially outer side with respect to the connecting shaft 61, detects the passage of the first light shield 82 and transmits a corresponding detection signal to the controller 16. That is, the first photodetector 84 detects the first light shield 82, rotating together with the sprocket wheel 37, for each revolution of the first light shield 82 and transmits a corresponding detection signal to the controller 16.

Second Detecting Device

Figure 10:
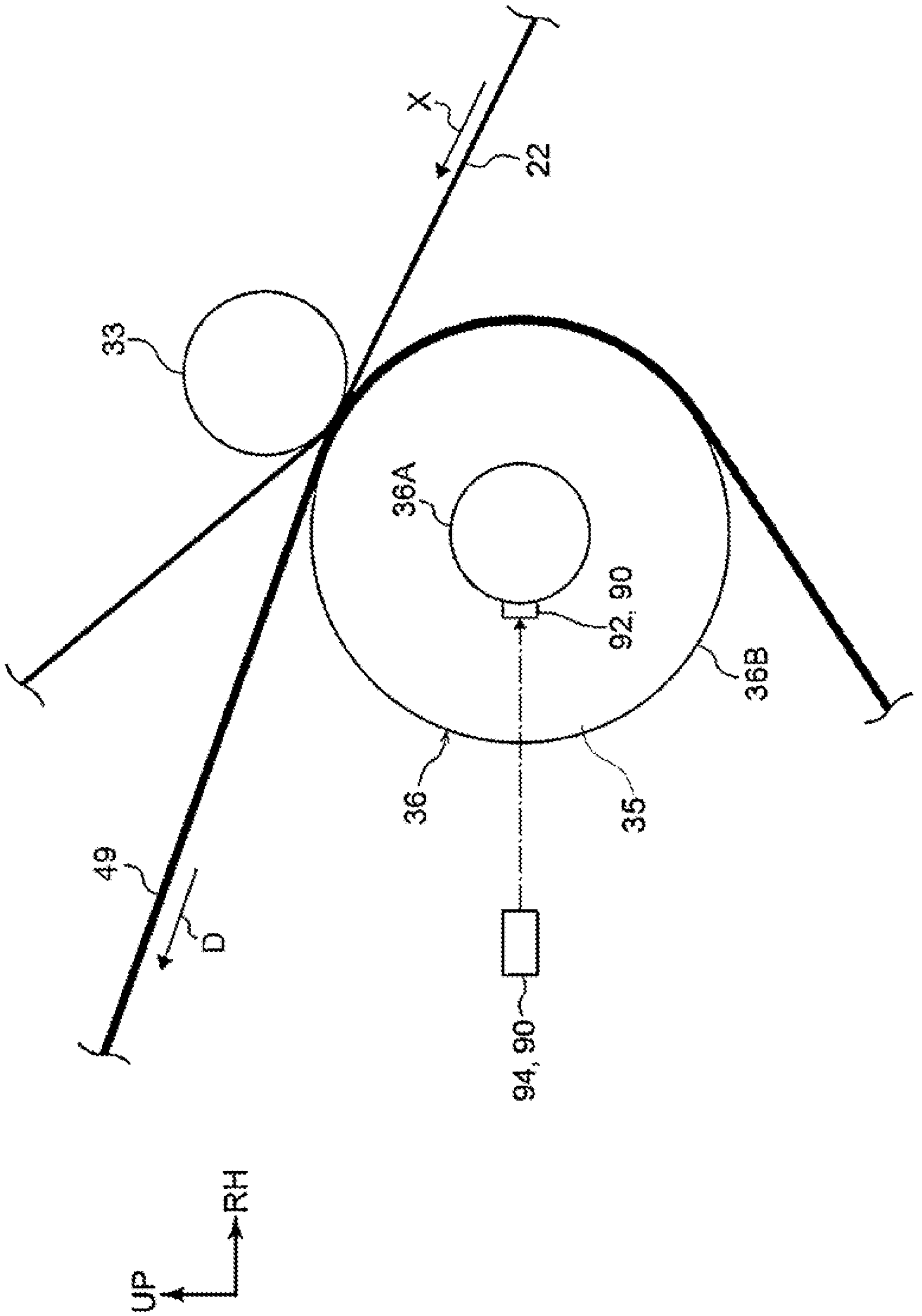
FIG. 10 is an enlargement of a second rotating member included in the image forming apparatus illustrated in FIG. 1, seen in the axial direction thereof.
Figure 11:
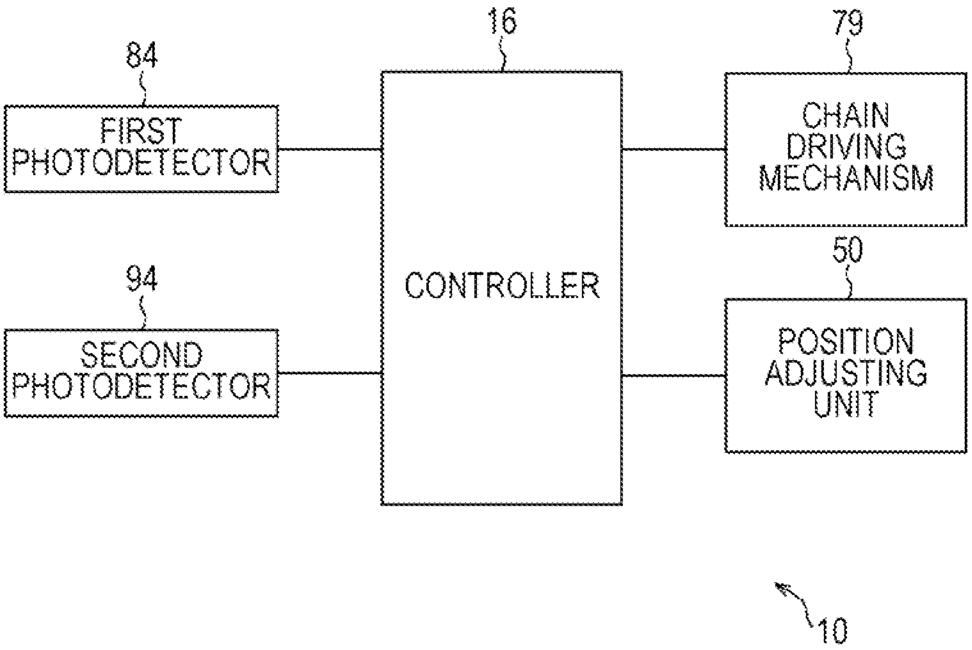
FIG. 11 is a block diagram of relevant units included in the image forming apparatus illustrated in FIG. 1.

The second detecting device 90 has a function of detecting the rotation of the sprocket wheel 35. Specifically, the second detecting device 90 detects the period of rotation of the shaft 36A to which the sprocket wheel 35 is attached. Referring to FIG. 10, the second detecting device 90 includes a second light shield 92 and a second photodetector 94. The second light shield 92 rotates together with the sprocket wheel 35. The second photodetector 94 is fixed to the apparatus body (in the present exemplary embodiment, the housing of the unit 10A) that supports the sprocket wheel 35, and detects the passage (i.e., shielding) of the second light shield 92 across an optical path. More specifically, the second light shield 92 is a plate attached to the outer circumference of the shaft 36A that rotates together with the sprocket wheel 35. While the second light shield 92 according to the present exemplary embodiment is attached to a position of the shaft 36A that is on the outer side with respect to the sprocket wheel 35 in the axial direction, the position of the second light shield 92 is not limited thereto. The second photodetector 94 is an optical sensor. When the second light shield 92 passes across the optical path, the second photodetector 94, which is positioned on the radially outer side with respect to the shaft 36A, detects the passage of the second light shield 92 and transmits a corresponding detection signal to the controller 16. That is, the second photodetector 94 detects the second light shield 92, rotating together with the sprocket wheel 35, for each revolution of the second light shield 92 and transmits a corresponding detection signal to the controller 16.

The period of rotation of the sprocket wheel 37 that is detected by the first detecting device 80 is equal to the period of rotation of the sprocket wheel 35 that is detected by the second detecting device 90. Specifically, in the present exemplary embodiment, the number of teeth 129 (see FIG. 9) of the sprocket wheel 37 is equal to the number of teeth (not illustrated) of the sprocket wheel 35. Accordingly, the period of rotation detected by the first detecting device 80 is equal to the period of rotation detected by the second detecting device 90.

Controller

The controller 16 has a function of generally controlling the image forming apparatus 10. The controller 16 is a computer provided as a piece of hardware including the following (not illustrated): a central processing unit (CPU), a read-only memory (ROM) that stores data such as programs for executing relevant processing routines, a random access memory (RAM) that temporarily stores data, a memory serving as a storage, and a network interface.

The controller 16 controls the speed of circulation of the chain 49 and other relevant factors. Specifically, referring to FIG. 11, the controller 16 controls a drive source (not illustrated) provided for a chain driving mechanism 79, which causes the chain 49 to circulate. The drive source for the chain driving mechanism 79 refers to, for example, a drive source that causes one of the plurality of sprocket wheels to rotate.

The controller 16 further controls the rotation of the transporting rollers 51 and 52 and the rotation of the registration rollers 55 and 56 for the position adjusting unit 50. That is, the controller 16 is capable of adjusting the speed of transport of the sheet P by adjusting the speed of rotation of the rollers provided in the position adjusting unit 50, including the registration rollers 55 and 56. The controller 16 may either equalize or vary the speed at which the sheet P is delivered from the position adjusting unit 50 and the speed at which the sheet P reaches the transfer position T. For example, the controller 16 may reduce the speed of the sheet P after the sheet P is delivered from the position adjusting unit 50 and before the leading end P1 (see FIG. 3) of the sheet P reaches the relay position D1. More specifically, the controller 16 may control the speed of rotation of the registration rollers 55 and 56 such that the sheet P delivered from the position adjusting unit 50 travels at a speed higher than the speed of circulation of the gripper 42 and is decelerated after the leading end P1 of the sheet P enters the gripper 42.

The controller 16 controls the delivery of the sheet P from the position adjusting unit 50 to the relay position D1 with reference to information (a detection signal CS1) detected by the first detecting device 80. For example, the controller 16 according to the present exemplary embodiment controls the timing of delivery of the sheet P to the relay position D1. Specifically, the controller 16 controls the speed of rotation of the registration rollers 55 and 56 such that the sheet P (the leading end P1 of the sheet P) reaches the relay position D1 during a period over which a relevant one of the attaching portions of the chain 49 where the grippers 42 are attached is in contact with the sprocket wheel 37 (in other words, while the relevant attaching portion of the chain 49 is moving around the sprocket wheel 37). More specifically, the controller 16 controls the speed of rotation of the registration rollers 55 and 56 such that the sheet P (the leading end P1 of the sheet P) reaches the relay position D1 when a relevant one of the grippers 42 reaches the relay position D1. Herein, the period over which the attaching portion of the chain 49 where the gripper 42 is attached is in contact with the sprocket wheel 37 refers to a period from when the attaching portion of the chain 49 where the gripper 42 is attached starts to mesh with the teeth of the sprocket wheel 37 until when the attaching portion of the chain 49 goes out of mesh with the teeth of the sprocket wheel 37.

The controller 16 further controls the timing of image formation by the image forming section 11 with reference to information (a detection signal CS2) detected by the second detecting device 90. Specifically, the controller 16 controls the timing of image formation (the timing of starting image formation) on the outer circumference of the transfer belt 22 by the image forming section 11 with reference to the detected information.

Figure 12:
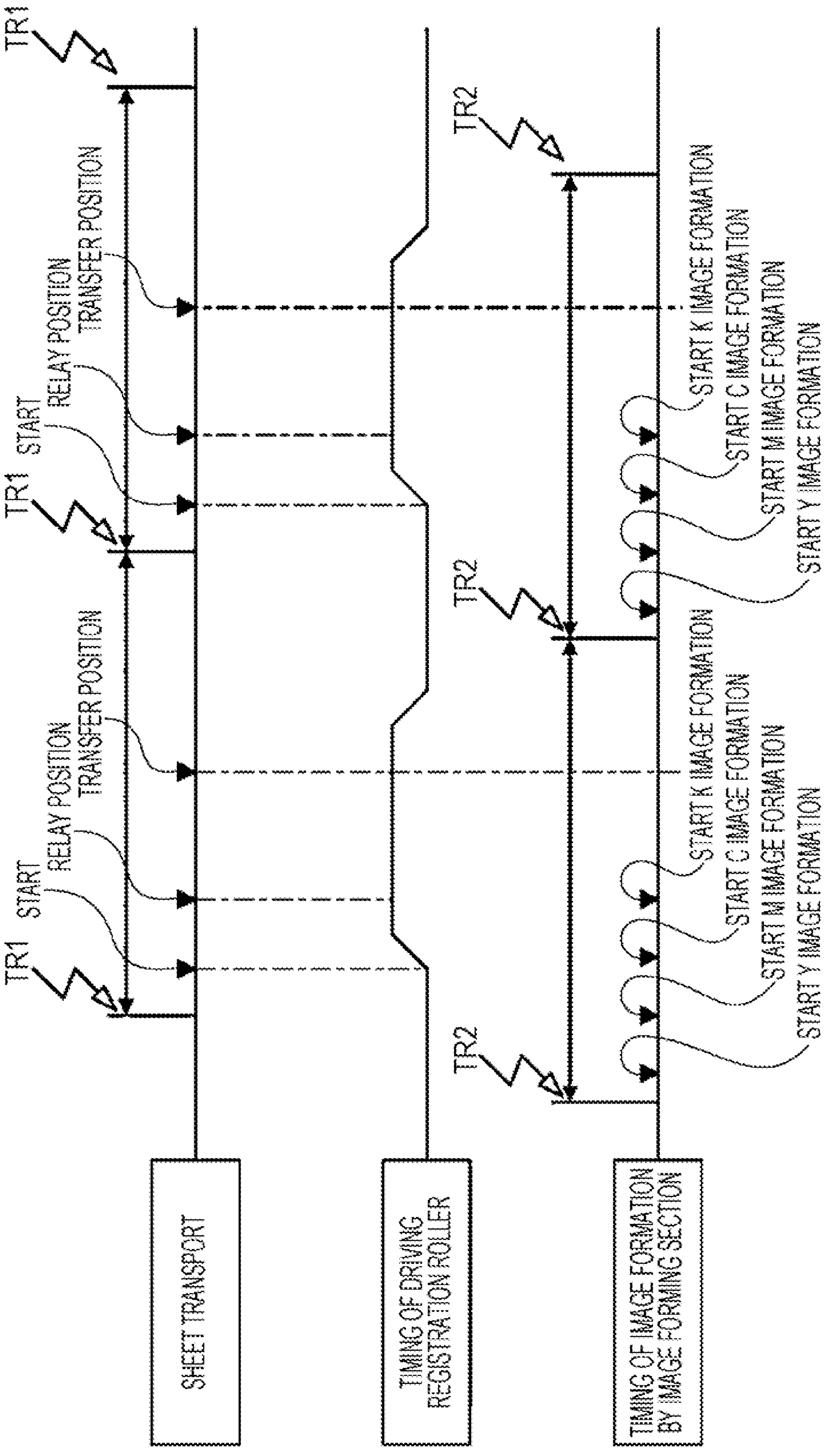
FIG. 12 illustrates the timings of sheet delivery and image formation in the image forming apparatus illustrated in FIG. 1.

FIG. 12 illustrates the progress of transport of the sheet P, the timing of driving the registration rollers 55 and 56, and the timing of image formation by the image forming section 11. As illustrated in FIG. 12, the controller 16 generates a trigger TR1, which is intended to deliver the sheet P from the position adjusting unit 50, with reference to the detection signal CS1 acquired periodically with the rotation of the sprocket wheel 37, whereby the sheet P is delivered toward the relay position D1 (transport is started). The sheet P thus reached the relay position D1 is retained at the leading end P1 thereof by the gripper 42 and is transported together with the gripper 42. When the sheet P reaches the transfer position T, the image formed on the surface of the transfer belt 22 is transferred to the sheet P. Meanwhile, before the generation of the trigger TR1, the controller 16 generates a trigger TR2, which is intended to start image formation by the image forming section 11, with reference to the detection signal CS2 acquired periodically with the rotation of the sprocket wheel 35. In the image forming section 11, when the trigger TR2 is generated, ink images are formed on the surface of the transfer belt 22 sequentially by the printheads 12Y, 12M, 12C, and 12K in that order. Then, an image composed of the ink images is transferred to the sheet P that has reached the transfer position T.

Functions

Functions exerted by the present exemplary embodiment are summarized as follows.

In the image forming apparatus 10 according to the present exemplary embodiment, the delivery of the sheet P from the position adjusting unit 50 to the relay position D1 is controlled by the controller 16 with reference to the information detected by the first detecting device 80. Note that what is controlled in the present exemplary embodiment is the timing of delivery of the sheet P to the relay position D1.

In particular, the sheet P is delivered to the relay position D1 with reference to the period of rotation (detection signal) of the sprocket wheel 37, which does not rotate together with either the transporting body 31 or the transferring body 36 but rotates together with the relaying body 60 where the sheet P is relayed to the gripper 42.

The controller 16 controls the delivery of the sheet P such that the sheet P reaches the relay position D1 during a period over which the attaching portion of the chain 49 to which the gripper 42 is attached is in contact with the sprocket wheel 37.

The controller 16 controls the delivery of the sheet P such that the sheet P reaches the relay position D1 when the gripper 42 reaches the relay position D1.

In the image forming apparatus 10, the relay position D1 is defined on the circumference of the relaying body 60, and the transfer position T is defined on the circumference of the transferring body 36.

In the image forming apparatus 10, the timing of image formation on the surface of the transfer belt 22 by the image forming section 11 is controlled by the controller 16 with reference to the information detected by the second detecting device 90. In particular, the image to be transferred (an exemplary transfer object image) is formed on the outer circumference of the transfer belt 22 with reference to the period of rotation of the sprocket wheel 35, which is not included in either the transporting body 31 or the relaying body 60 but is included in the transferring body 36 by which the image is transferred to the sheet P.

In the image forming apparatus 10, the rotation of each of the sprocket wheel 37 and the sprocket wheel 35 is detected with the optical sensor, i.e., a photodetector.

The period of rotation of the sprocket wheel 37 that is detected by the first detecting device 80 and the period of rotation of the sprocket wheel 35 that is detected by the second detecting device 90 are equal.

Figure 13:
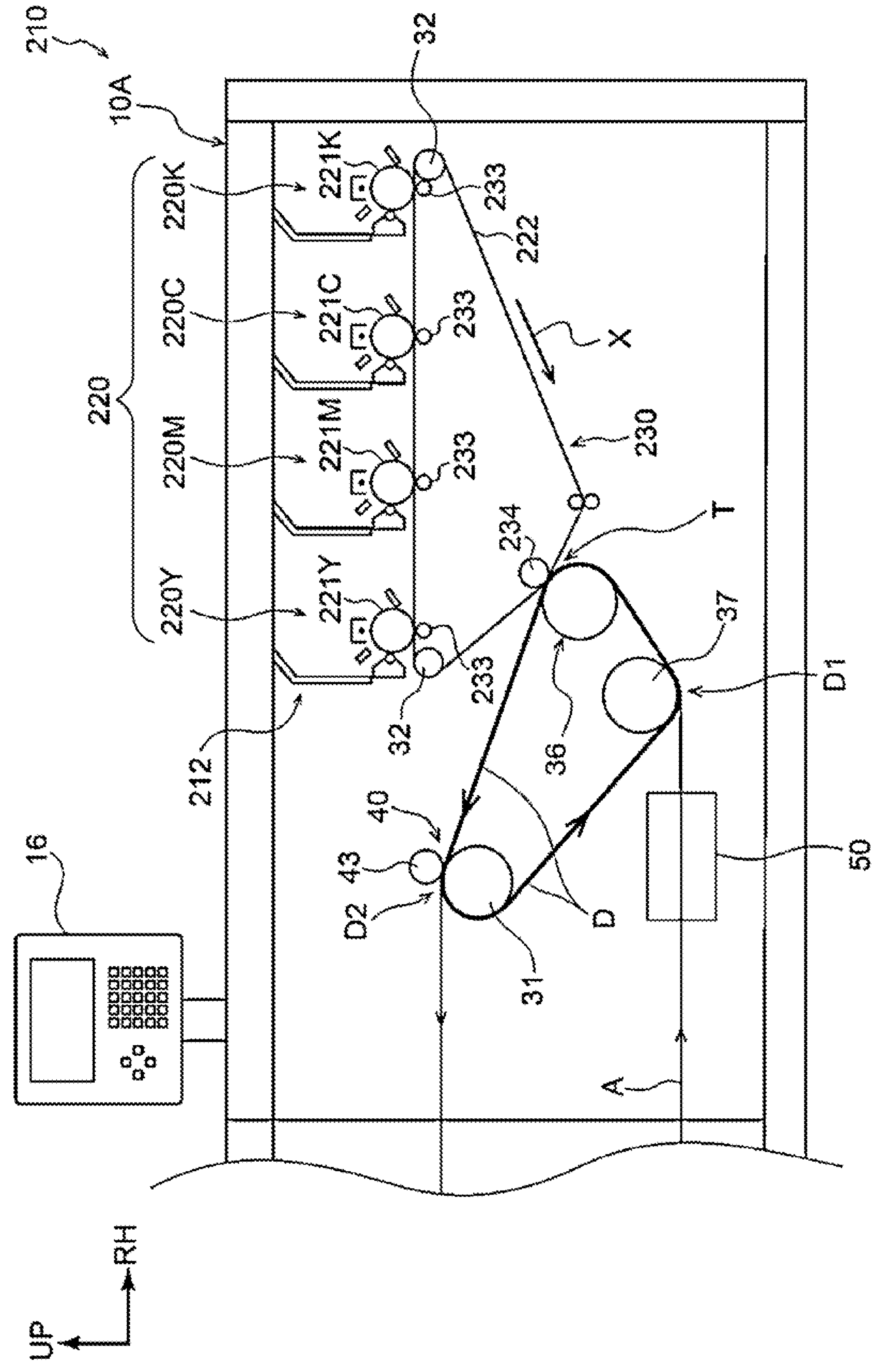
FIG. 13 is an enlargement of a part, corresponding to the part illustrated in FIG. 2, of an image forming apparatus according to another exemplary embodiment, around the position of image formation by an image forming section.

The above functions exerted by the present exemplary embodiment are not limited to those exerted by an inkjet image forming apparatus and are also exerted in the same manner by, for example, an electrophotographic image forming apparatus, in which an image is formed with toners. Now, an image forming apparatus 210 will be described. The image forming apparatus 210 is an exemplary electrophotographic image forming apparatus according to another exemplary embodiment of the present disclosure. Referring to FIG. 13, the image forming apparatus 210 includes an image forming section 212 and a transfer unit 230 in replacement of the image forming section 11 and the transfer unit 30 included in the image forming apparatus 10. The transfer unit 230 includes a transfer belt 222 and a second transfer roller 234 in replacement of the transfer belt 22 and the transfer roller 33. The transfer unit 230 further includes first transfer rollers 233, which are provided for images in different colors, respectively. The first transfer rollers 233 are in contact with the inner circumferential surface of the transfer belt 222. The image forming section 212 includes a plurality of toner-image-forming units 220 (220Y, 220M, 220C, and 220K) in replacement of the printheads 12 included in the image forming apparatus 10. The toner-image-forming units 220 form respective toner images. The toner-image-forming units 220 for the respective colors include respective photoconductor drums 221 (221Y, 221M, 221C, and 221K), which are provided across the transfer belt 222 from the respective first transfer rollers 223. The toner-image-forming units 220 form toner images in the respective colors on the respective photoconductor drums 221. The toner images thus formed are sequentially transferred to the transfer belt 222 at respective first transfer positions, which are defined between the photoconductor drums 221 and the first transfer rollers 233. An image composed of the toner images thus formed on the transfer belt 222 is transferred to a sheet P at a second transfer position T, which is the image forming position defined between the second transfer roller 234 and the transferring body 36. The other details of the electrophotographic image forming apparatus 210 are the same as those of the inkjet image forming apparatus 10.

While the above exemplary embodiment relates to a configuration in which an ink image is formed on the surface of the transfer belt 22 and is transferred to a sheet P, the present disclosure is not limited thereto. For example, an ink image may be formed by ejecting ink droplets from the printheads 12 directly to a sheet P.

While the above exemplary embodiment relates to a configuration in which the timing of delivery of the sheet P from the position adjusting unit 50 to the relay position D1 is controlled with reference to the information detected by the first detecting device 80, the present disclosure is not limited thereto. For example, the speed of delivery of the sheet P from the position adjusting unit 50 to the relay position D1 may be controlled with reference to the information detected by the first detecting device 80. Alternatively, both the timing and the speed of delivery of the sheet P to the relay position D1 may be controlled.

Figure 14:
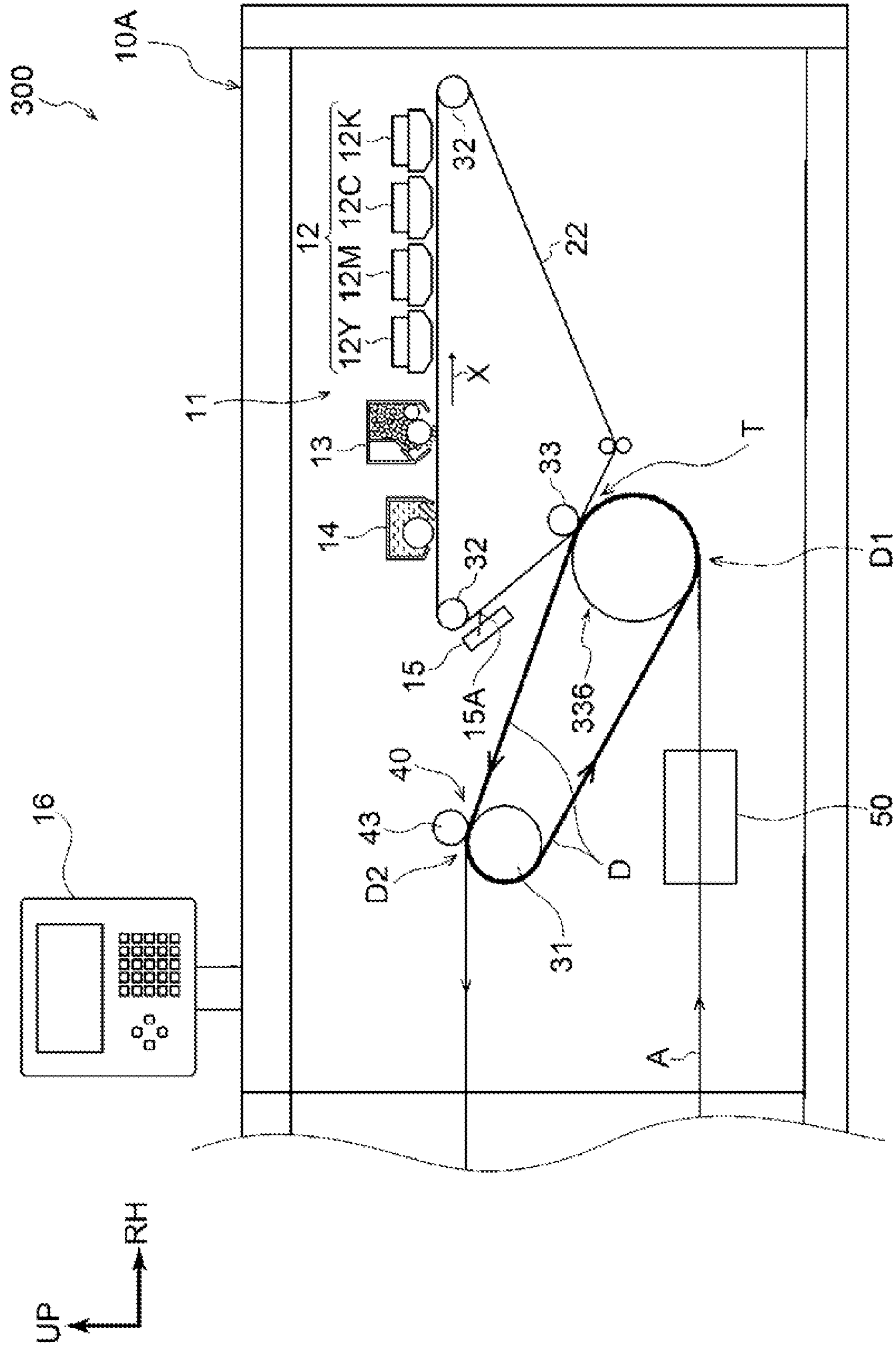
FIG. 14 is an enlargement of a part, corresponding to the part illustrated in FIG. 2, of an image forming apparatus according to yet another exemplary embodiment, around the position of image formation by an image forming section.
Figure 15:
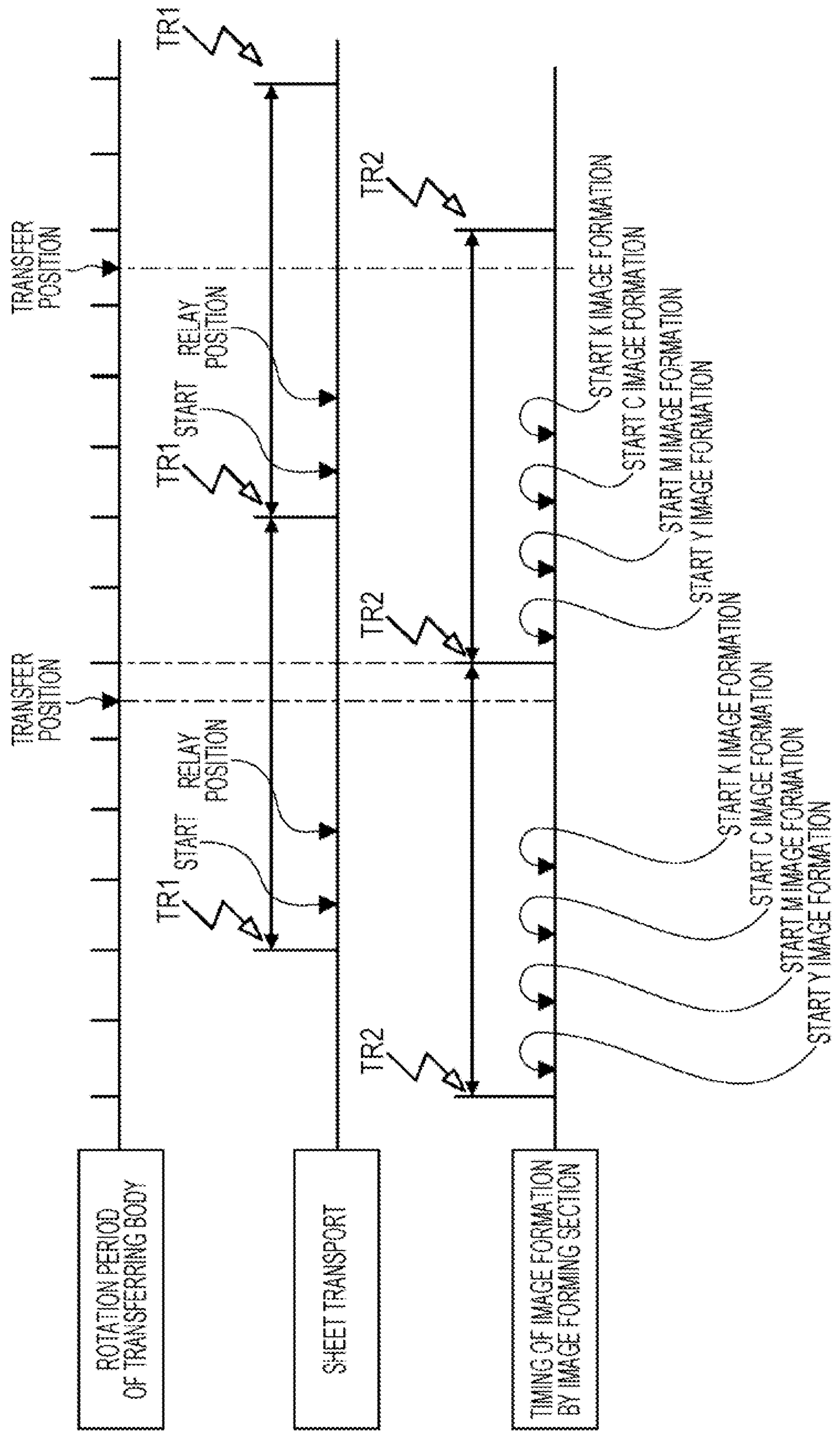
FIG. 15 illustrates the timings of sheet delivery and image formation in the image forming apparatus illustrated in FIG. 14.

While the above exemplary embodiment relates to a configuration in which the sheet P delivered from the position adjusting unit 50 is retained by the gripper 42 at the relay position D1 defined on the outer circumference of the relaying body 60 and an image is formed on the sheet P retained by the gripper 42 at the transfer position T defined on the outer circumference of the transferring body 36, the present disclosure is not limited thereto. For example, the present disclosure may be applied to an image forming apparatus 300 illustrated in FIG. 14. The image forming apparatus 300 includes a transferring body 336, which also serves as the relaying body 60. In such a configuration, the sheet P delivered from the position adjusting unit 50 is first retained by the gripper 42 at the relay position D1, which is defined on the outer circumference of the transferring body 336. The sheet P thus retained by the gripper 42 is transported together with the gripper 42 by the chain 49 and is wound around the transferring body 336. The sheet P thus wound around the transferring body 336 receives at the transfer position T a transfer object image formed by the image forming section 11. The period of rotation of the transferring body 336, the progress of transport of the sheet P, and the timing of image formation by the image forming section 11 in the image forming apparatus 300 are illustrated in FIG. 15.

While the first detecting device 80 according to the above exemplary embodiment detects the rotation of the sprocket wheel 37 by detecting the passage of the first light shield 82 across the optical path of the first photodetector 84, in the present disclosure, the detection may be performed either continuously or intermittently, as long as the rotation of the sprocket wheel 37 is detectable. Exemplary methods of continuous detection include a method in which the location of a specific position (a site or a mark) of the sprocket wheel 37 is detected (monitored) continuously over a wide area. More specifically, the location of a specific position (a site or a mark) of the sprocket wheel 37 may be detected from information on an image of an area where the sprocket wheel 37 and relevant elements therearound are provided. Exemplary methods of intermittent detection include a method in which, as with the case of the first detecting device 80, when a specific position (a site or a mark) of the sprocket wheel 37 has passed a specific location (a position where an optical sensor is provided) is detected. As with the case of the first detecting device 80, the second detecting device 90 may also be configured to perform either continuous detection or intermittent detection of the rotation of the sprocket wheel 35.

While the above exemplary embodiments each relate to a configuration including a chain serving as the circulating member and sprocket wheels serving as the rotating members, the present disclosure is not limited thereto. For example, the circulating member may be a timing belt, which has projections and recesses on the inner circumference thereof, and the rotating members may each be a timing pulley, which has projections and recesses on the outer circumference thereof. Alternatively, the circulating member may be a belt, and the rotating members may each be a pulley that causes the belt to circulate by friction. In such a configuration, the pulley does not mesh with the belt but is in contact with the belt and rotates in that state, thereby causing the belt to circulate.

The configuration of the image forming apparatus is not limited those described in the above exemplary embodiments and may be modified in various ways. Furthermore, the present disclosure may be embodied in various other ways without departing from the essence thereof.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

a plurality of rotating members that are rotatable;

an annular circulating member that is wound around the plurality of rotating members and circulates when the rotating members rotate;

a retaining member attached to an attaching portion of the circulating member and that circulates together with the circulating member, the retaining member being configured to retain a recording medium in an area where the attaching portion comes into contact with one of the rotating members;

an image forming section that forms an image on the recording medium at an image forming position defined on a circulation path along which the circulating member circulates;

a delivering unit that delivers the recording medium to a retaining position where the recording medium is to be retained by the retaining member;

a detector that detects rotation of the one rotating member; and a controller that controls delivery of the recording medium from the delivering unit to the retaining position, the delivery being controlled with reference to information detected by the detector, wherein the one rotation member is positioned upstream of the image forming position on the circulation path.

2. The image forming apparatus according to claim 1, wherein the controller controls the delivery such that the recording medium reaches the retaining position during a period over which the attaching portion is in contact with the one rotating member.

3. The image forming apparatus according to claim 2, wherein the controller controls the delivery such that the recording medium reaches the retaining position when the retaining member reaches the retaining position.

4. The image forming apparatus according to claim 1, wherein a timing of image formation by the image forming section is controlled by the controller with reference to the information detected by the detector.

5. The image forming apparatus according to claim 2, wherein a timing of image formation by the image forming section is controlled by the controller with reference to the information detected by the detector.

6. The image forming apparatus according to claim 3, wherein a timing of image formation by the image forming section is controlled by the controller with reference to the information detected by the detector.

7. The image forming apparatus according to claim 4, further comprising:

a body that rotates together with the one rotating member and around which the recording medium to be retained by the retaining member is to be wound; and a transferring member included in the image forming section and on an outer circumference of which a transfer object image is to be formed, the transferring member transferring at the image forming position the transfer object image to the recording medium that is wound around the body.

8. The image forming apparatus according to claim 5, further comprising:

a body that rotates together with the one rotating member and around which the recording medium to be retained by the retaining member is to be wound; and a transferring member included in the image forming section and on an outer circumference of which a transfer object image is to be formed, the transferring member transferring at the image forming position the transfer object image to the recording medium that is wound around the body.

9. The image forming apparatus according to claim 6, further comprising:

a body that rotates together with the one rotating member and around which the recording medium to be retained by the retaining member is to be wound; and a transferring member included in the image forming section and on an outer circumference of which a transfer object image is to be formed, the transferring member transferring at the image forming position the transfer object image to the recording medium that is wound around the body.

10. The image forming apparatus according to claim 1, wherein the detector includes:

a light shield that rotates together with the one rotating member; and a photodetector that is fixed to an apparatus body having a supporting portion that supports the rotating member, the photodetector detecting passage of the light shield across an optical path.

11. The image forming apparatus according to claim 2, wherein the detector includes:

a light shield that rotates together with the one rotating member; and a photodetector that is fixed to an apparatus body having a supporting portion that supports the rotating member, the photodetector detecting passage of the light shield across an optical path.

12. The image forming apparatus according to claim 3, wherein the detector includes:

a light shield that rotates together with the one rotating member; and a photodetector that is fixed to an apparatus body having a supporting portion that supports the rotating member, the photodetector detecting passage of the light shield across an optical path.

13. The image forming apparatus according to claim 4, wherein the detector includes:

a light shield that rotates together with the one rotating member; and a photodetector that is fixed to an apparatus body having a supporting portion that supports the rotating member, the photodetector detecting passage of the light shield across an optical path.

14. The image forming apparatus according to claim 5, wherein the detector includes:

a light shield that rotates together with the one rotating member; and a photodetector that is fixed to an apparatus body having a supporting portion that supports the rotating member, the photodetector detecting passage of the light shield across an optical path.

15. The image forming apparatus according to claim 6, wherein the detector includes:

a light shield that rotates together with the one rotating member; and a photodetector that is fixed to an apparatus body having a supporting portion that supports the rotating member, the photodetector detecting passage of the light shield across an optical path.

16. The image forming apparatus according to claim 7, wherein the detector includes:

a light shield that rotates together with the one rotating member; and a photodetector that is fixed to an apparatus body having a supporting portion that supports the rotating member, the photodetector detecting passage of the light shield across an optical path.

17. The image forming apparatus according to claim 1, further comprising:

a first rotating member serving as the one rotating member;

a second rotating member serving as another one of the plurality of rotating members that is positioned on a downstream side with respect to the first rotating member in a direction of transport of the recording medium;

a body that rotates together with the second rotating member and around which the recording medium to be retained by the retaining member is to be wound; and a transferring member included in the image forming section and on an outer circumference of which a transfer object image is to be formed, the transferring member transferring at the image forming position the transfer object image to the recording medium that is wound around the body.

18. The image forming apparatus according to claim 17, further comprising:

a first detector serving as the detector and that detects rotation of the first rotating member; and a second detector that detects rotation of the second rotating member, wherein a timing of forming a transfer object image to the outer circumference of the transferring member by the image forming section is controlled by the controller with reference to information detected by the second detector.

19. The image forming apparatus according to claim 18, wherein the first detector includes:

a first light shield that rotates together with the first rotating member; and a first photodetector that is fixed to an apparatus body having a first supporting portion that supports the first rotating member, the first photodetector detecting passage of the first light shield across an optical path, and wherein the second detector includes:

a second light shield that rotates together with the second rotating member; and a second photodetector that is fixed to the apparatus body having a second supporting portion that supports the second rotating member, the second photodetector detecting passage of the second light shield across an optical path.

20. The image forming apparatus according to claim 18, wherein a period of rotation of the first rotating member that is detected by the first detector and a period of rotation of the second rotating member that is detected by the second detector are equal.

* * * * *